United States Patent
Vallius

(10) Patent No.: US 12,436,563 B2
(45) Date of Patent: Oct. 7, 2025

(54) DETECTING AN ORIENTATION OF A WEARABLE DEVICE USING DIFFERENT WAVELENGTHS OF TRANSMITTED LIGHT

(71) Applicant: Oura Health Oy, Oulu (FI)

(72) Inventor: Tero Juhani Vallius, Kontio (FI)

(73) Assignee: Oura Health Oy, Oulu (FI)

( * ) Notice: Subject to any disclaimer, the term of this patent is extended or adjusted under 35 U.S.C. 154(b) by 85 days.

(21) Appl. No.: 18/449,899

(22) Filed: Aug. 15, 2023

(65) Prior Publication Data
US 2025/0060780 A1 Feb. 20, 2025

(51) Int. Cl.
*G06F 1/16* (2006.01)
*A61B 5/00* (2006.01)

(52) U.S. Cl.
CPC ............ *G06F 1/163* (2013.01); *A61B 5/6802* (2013.01); *A61B 5/6826* (2013.01); *G06F 2200/1637* (2013.01)

(58) Field of Classification Search
CPC ............. G06F 1/163; G06F 2200/1637; A61B 5/6802; A61B 5/6826
See application file for complete search history.

(56) References Cited

U.S. PATENT DOCUMENTS

| | | | |
|---|---|---|---|
| 12,164,027 B1 * | 12/2024 | Duan | G01S 7/4808 |
| 2020/0163616 A1 * | 5/2020 | Sakaya | A61B 5/0022 |
| 2023/0281855 A1 * | 9/2023 | Kuo | G06T 11/00 345/633 |
| 2023/0404419 A1 * | 12/2023 | Allec | A61B 5/6844 |
| 2024/0358267 A1 * | 10/2024 | Hamidi Shishavan | A61B 5/742 |

* cited by examiner

*Primary Examiner* — Kwang-Su Yang
(74) *Attorney, Agent, or Firm* — Holland & Hart LLP

(57) ABSTRACT

Methods, systems, and devices for detecting an orientation of a wearable device are described. The method may include the wearable device transmitting, using a light-emitting component, first light and second light and generating a first signal and a second signal based on the first light and the second light, respectively, received using photodetectors. The first and second light may be associated with first and second wavelengths, where signals associated with the first wavelength are relatively unaffected by varying orientations of the wearable device, whereas signals associated with the second wavelength vary based on different orientations of the wearable device. Further, the wearable device may determine an orientation of the wearable device worn by the user based on a comparison of a first signal and the second signal, and may acquire physiological data from the user via the wearable device using measurement parameters that are determined based on the orientation.

19 Claims, 9 Drawing Sheets

DETECTING AN ORIENTATION OF A WEARABLE DEVICE USING DIFFERENT WAVELENGTHS OF TRANSMITTED LIGHT

FIELD OF TECHNOLOGY

The following relates to wearable devices and data processing, including techniques for detecting an orientation of a wearable device.

BACKGROUND

Some wearable devices may be configured to collect physiological data from users associated with the wearable devices. In order to collect the physiological data, a wearable device may utilize a set of optical components (e.g., light-emitting components and photodetectors). If the wearable device includes a ring, the optical components may be positioned along an inner housing of the ring. As the ring rotates about the user's finger, the optical components may also rotate resulting in different optical component orientations (e.g., optical components facing the palm-side or dorsal-side of the user's finger). In some examples, the orientation of the optical components may impact the accuracy of the physiological data.

DETAILED DESCRIPTION

Figure 1:
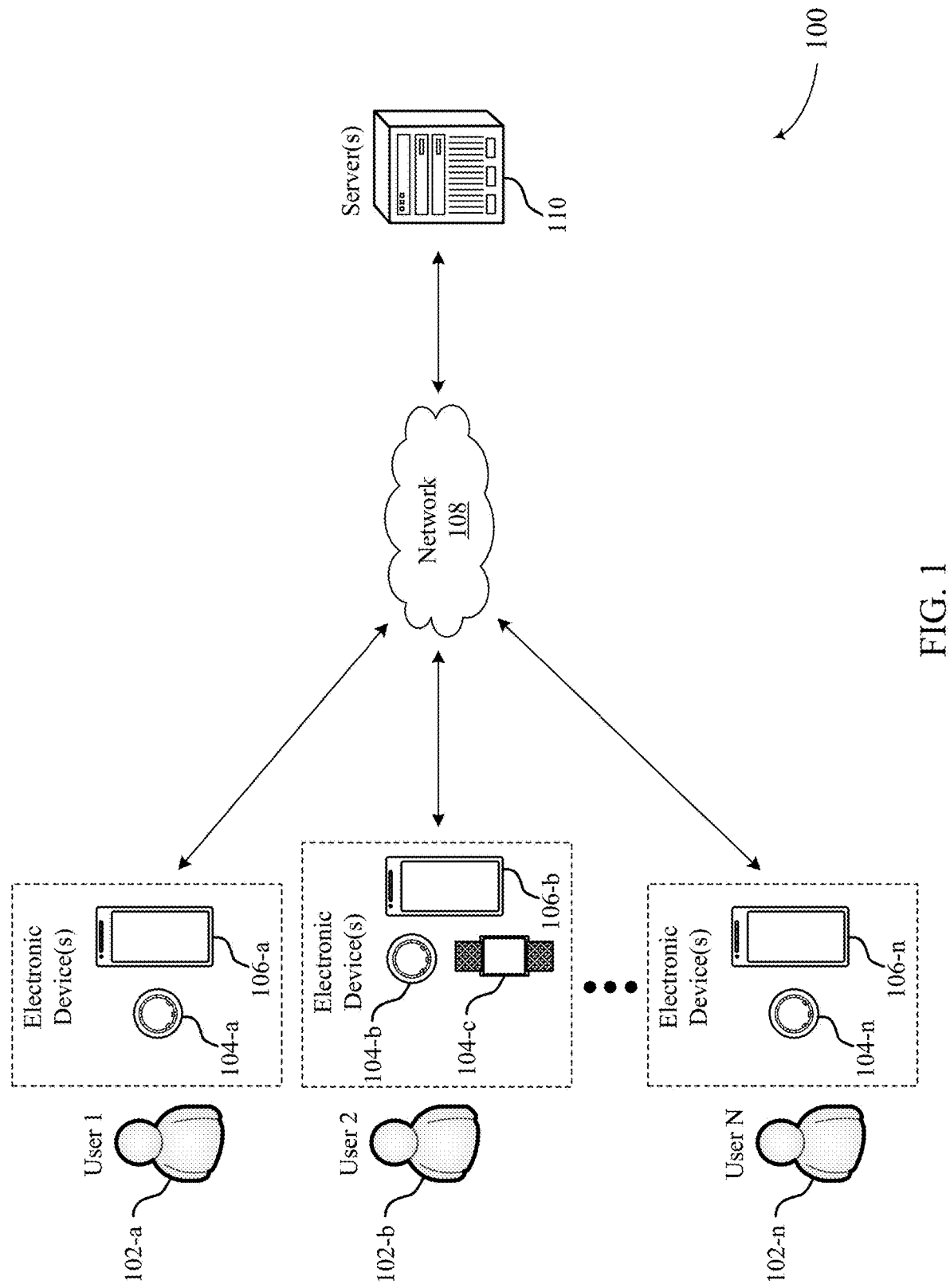
FIG. 1 illustrates an example of a system that supports techniques for detecting an orientation of a wearable device in accordance with aspects of the present disclosure.

In some examples, a wearable device may collect physiological data from a user of the wearable device using one or more optical components. The optical components may include at least a light-emitting component (e.g., a light-emitting diode (LED)) and a photodetector. In some examples, the wearable device may include a ring and the optical components may be positioned along an inner circumference of the ring facing the user's finger. Due to physiological characteristics of the user's finger, the wearable device may achieve a better optical signal quality when the optical components are facing towards a palm-side of the user's finger versus a dorsal-side of the user's finger. In particular, the bones of the finger may be closer to the dorsal-side of the finger than the palm-side of the finger. Thus, when the optical components are facing the dorsal-side of the finger, more light may be absorbed due to the proximity of the bone resulting in a weaker signal received by the photodetectors compared to when the optical components are facing the palm-side of the finger.

As described herein, the wearable device may estimate an orientation of the optical components or a rotation of the wearable device such that the wearable device may acquire accurate physiological data from the user. In some examples, the wearable device may include at least a photodetector and a light-emitting component. Using the light-emitting component, the wearable device may transmit first light and second light towards the finger of the user and using the photodetector, the wearable device may receive the first light and the second light. In some examples, the first light may be (relatively) unaffected by the orientation or rotation of the wearable device, whereas the second light may be affected by the orientation or rotation of the wearable device. Upon receiving the first light and the second light, the wearable device may determine a signal strength (or a direct current (DC) level) of each of the received first light and second light and determine an orientation of the wearable device based on a ratio between the signal strength of the first light and a signal strength of the second light.

In some cases, after determining the orientation of the wearable device, the wearable device and/or a user device may provide an alert to the user to adjust the orientation of the wearable device to achieve better physiological data measurement. Moreover, upon determining the orientation of the wearable device, the wearable device may adjust one or more measurement parameters associated with obtaining the physiological data. For example, the wearable device may select optical channels that will result in higher quality physiological data and/or lower power consumption based on the determined orientation (e.g., activate LEDs facing the palm-side of the user's finger, and deactivate LEDs facing the dorsal side of the user's finger). By way of another example, in cases where the wearable device is in a sub-optimal orientation, the wearable device may increase a voltage or current provided to LEDs of the wearable device to improve the quality of collected physiological data (e.g., improve data quality despite the sub-optimal orientation).

The methods as described herein may allow the wearable device to discover an orientation of the wearable device and update measurement parameters based on such orientation in order to account for any negative impacts of the orientation on the accuracy of the physiological data.

Aspects of the disclosure are initially described in the context of systems supporting physiological data collection from users via wearable devices. Additional aspects of the disclosure are described in the context of a graphical user interface (GUI). Aspects of the disclosure are further illustrated by and described with reference to apparatus diagrams, system diagrams, and flowcharts that relate to techniques for detecting an orientation of a wearable device.

FIG. 1 illustrates an example of a system 100 that supports techniques for detecting an orientation of a wearable device in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g., in a hypothetical culture with 12 day "weeks," 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for detecting an orientation of the wearable device 104. In some examples, a method for detecting the orientation of the wearable device 104 worn by the user 102 may include the wearable device 104 transmitting, using one or more light-emitting components of the wearable device 104, first light associated with a first wavelength (e.g., IR light) and second light associated with a second wavelength (e.g., red light). Further, the method may include the wearable device 104 generating a first signal based on the first light received by one or more photodetectors of the wearable device and generating a second signal based on the second light received by the one or more photodetectors.

Upon generating the first signal and the second signal, the wearable device 104 may determine an orientation metric associated with an orientation of the wearable device 104 based on a comparison of a first signal strength associated with the first signal and a second signal strength associated with the second signal. In some examples, a signal strength associated with light of the first wavelength may stay relatively constant regardless of the orientation of the wearable device 104 whereas a signal strength associated with light of the second wavelength may change as the orientation of the wearable device 104 changes. As such, because the first signal strength remains relatively constant, whereas the second signal strength changes as a result of varying orientations, a comparison of the signal strengths may be used to determine or estimate an orientation of the wearable device 104.

The wearable device 104 may update measurement parameters for acquiring physiological data from the user 102 based on the orientation metric. For example, if the orientation metric indicates that the optical components are in a less than desirable orientation (e.g., facing towards a dorsal-side of the user's finger), the wearable device 104 may increase a transmit power of the light-emitting component or adjust an algorithm for analyzing light received by the photodetector while performing physiological measurements to increase the accuracy of the acquired physiological data.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
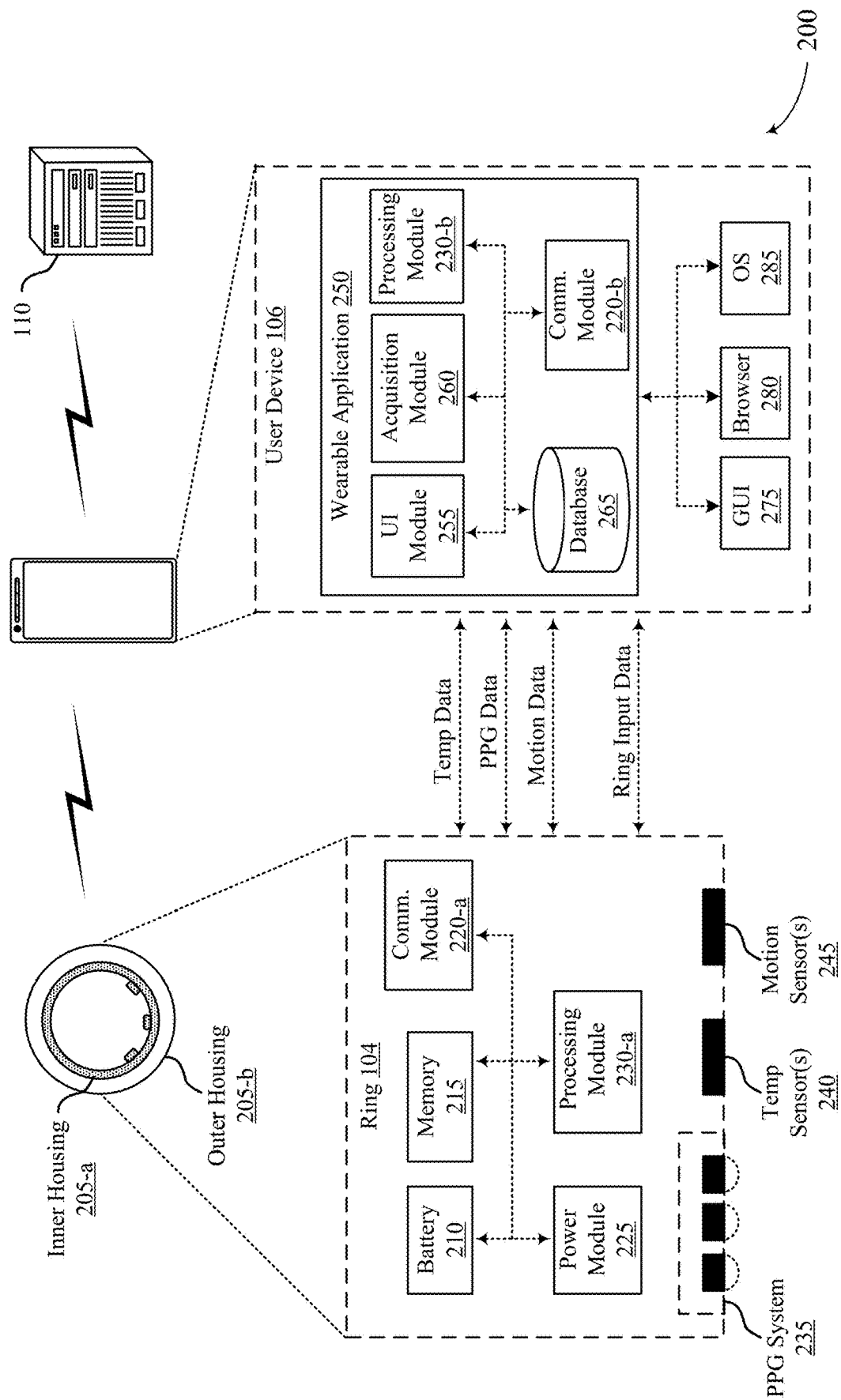
FIG. 2 illustrates an example of a system that supports techniques for detecting an orientation of a wearable device in accordance with aspects of the present disclosure.

FIG. 2 illustrates an example of a system 200 that supports techniques for detecting an orientation of a wearable device in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-a and an outer housing 205-b. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-a, a memory 215, a communication module 220-a, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-b component (e.g., a shell) and an inner housing 205-a component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-b (e.g., a metal outer housing 205-b). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-b may be fabricated from one or more materials. In some implementations, the outer housing 205-b may include a metal, such as titanium, that may provide strength and abrasion resistance at a relatively light weight. The outer housing 205-b may also be fabricated from other materials, such polymers. In some implementations, the outer housing 205-b may be protective as well as decorative.

The inner housing 205-a may be configured to interface with the user's finger. The inner housing 205-a may be formed from a polymer (e.g., a medical grade polymer) or other material. In some implementations, the inner housing 205-a may be transparent. For example, the inner housing 205-a may be transparent to light emitted by the PPG light emitting diodes (LEDs). In some implementations, the inner housing 205-a component may be molded onto the outer housing 205-b. For example, the inner housing 205-a may include a polymer that is molded (e.g., injection molded) to fit into an outer housing 205-b metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-a of the ring 104 may include one or more processors (e.g., processing units), microcontrollers, digital signal processors, systems on a chip (SOCs), and/or other processing devices. The processing module 230-a communicates with the modules included in the ring 104. For example, the processing module 230-a may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-a may communicate with the memory 215. The memory 215 may include computer-readable instructions that, when executed by the processing module 230-a, cause the processing module 230-a to perform the various functions attributed to the processing module 230-a herein. In some implementations, the processing module 230-a (e.g., a microcontroller) may include additional features associated with other modules, such as communication functionality provided by the communication module 220-a (e.g., an integrated Bluetooth Low Energy transceiver) and/or additional onboard memory 215.

The communication module 220-a may include circuits that provide wireless and/or wired communication with the user device 106 (e.g., communication module 220-b of the user device 106). In some implementations, the communication modules 220-a, 220-b may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include LEDs. The optical transmitters may transmit light in the infrared (IR) spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for detecting an orientation of the wearable device 104. In some examples, a method for detecting the orientation of the wearable device 104 worn by the user 102 may include the wearable device 104 transmitting, using one or more light-emitting components of the wearable device 104, first light associated with a first wavelength (e.g., IR light) and second light associated with a second wavelength (e.g., red light). Further, the method may include the wearable device 104 generating a first signal based on the first light received by one or more photodetectors of the wearable device and generating a second signal based on the second light received by the one or more photodetectors.

Upon generating the first signal and the second signal, the wearable device 104 may determine an orientation metric associated with an orientation of the wearable device 104 based on a comparison of a first signal strength associated with the first signal and a second signal strength associated with the second signal. In some examples, a signal strength associated with light of the first wavelength may stay relatively constant regardless of the orientation of the wearable device 104 whereas a signal strength associated with light of the second wavelength may change as the orientation of the wearable device 104 changes.

In the context of a wearable ring device, the "orientation metric" may include a degree of rotation of the wearable ring device around the user's finger relative to some baseline orientation (e.g., orientation metric may include "rotated 45° counterclockwise," "rotated 90° clockwise," etc.).

The wearable device 104 may update measurement parameters for acquiring physiological data from the user 102 based on the orientation metric. For example, if the orientation metric indicates that the optical components are in a less than desirable orientation (e.g., facing towards a dorsal-side of the user's finger), the wearable device 104 may increase a transmit power of the light-emitting component or adjust an algorithm for analyzing light received by the photodetector while performing physiological measurements to increase the accuracy of the acquired physiological data.

Figure 3:
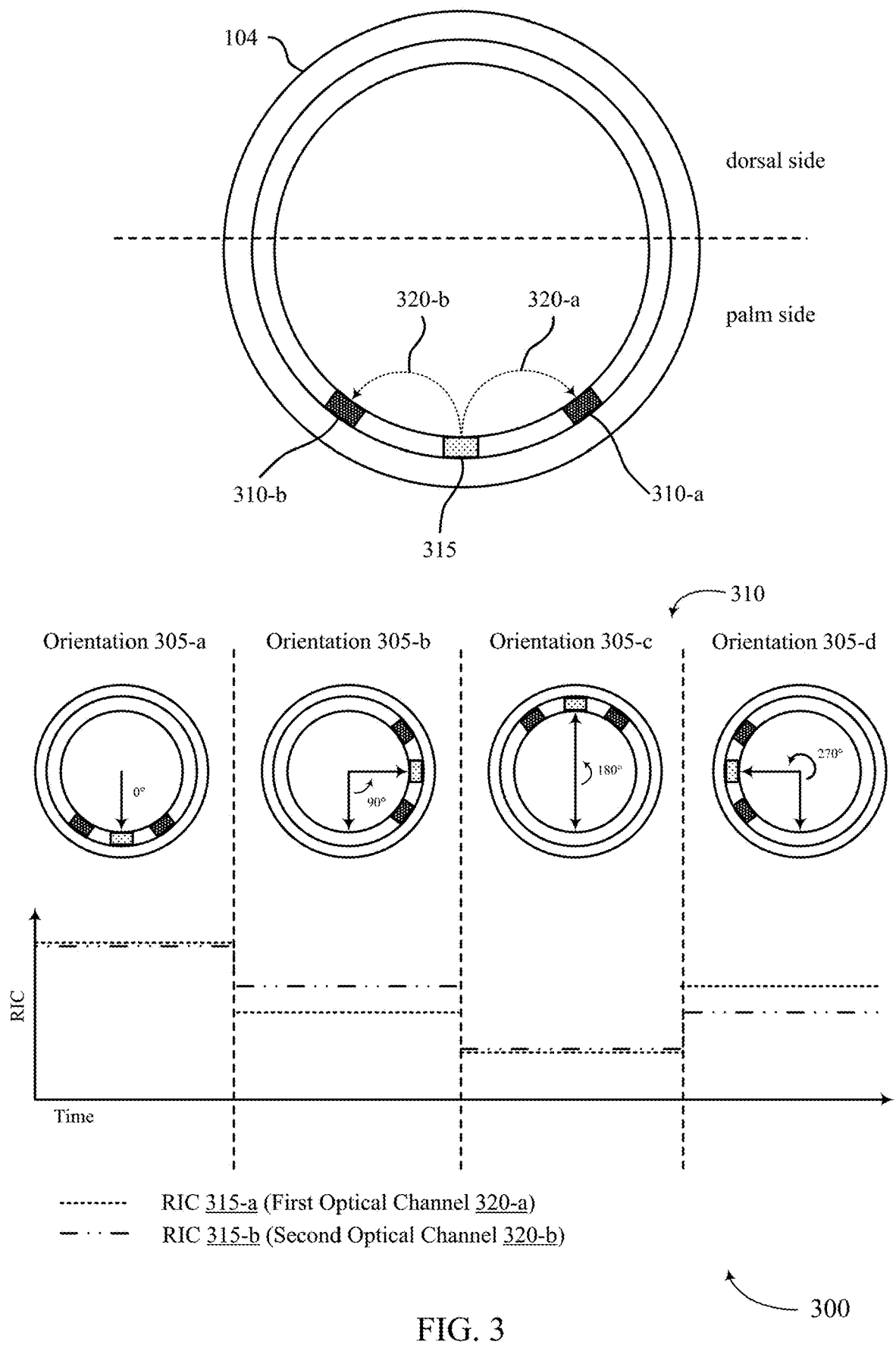
FIG. 3 shows an example of a system that supports techniques for detecting an orientation of a wearable device in accordance with aspects of the present disclosure.

FIG. 3 shows an example of a system 300 that supports techniques for detecting an orientation of a wearable device in accordance with aspects of the present disclosure. In some examples, the system 300 may implement, or be implemented by, aspects of the system 100, the system 200, or both. For example, the system 300 may include a wearable device 104 which may be an example of a wearable device 104 or a ring 104 as described with reference to FIGS. 1 and 2, respectively.

As described with reference to FIG. 2, the wearable device 104 may perform physiological measurements for a user of the wearable device 104. The physiological measurements may include heart rate measurements, blood oxygen saturation measurements, HRV measurements, etc. To perform the physiological measurements, the wearable device 104 may include one or more optical components. For example, as shown in FIG. 3, the wearable device 104 may include one or more light-emitting components 315 (e.g., a light-emitting component 315) and one or more photodetectors 310 (e.g., a photodetector 310-a and a photodetector 310-b). In some examples, the wearable device 104 may be an example of a ring and the one or more optical components may be positioned along an inner-housing or an inner-circumference of the ring. Further, as shown in FIG. 3, the photodetectors 310 may be located on either side of the light-emitting component 315. However, other configurations of optical components are possible. Moreover, the ring 104 is shown solely for illustrative purposes, and may include different quantities of photodetectors 310 and light-emitting components 315 (e.g., three light-emitting components 315, etc.).

The light-emitting components 315 may be configured to transmit light and the photodetectors 310 may be configured to receive the light transmitted from the light-emitting components 315. For a ring, the light-emitting component 315 may transmit light towards a finger of the user such that the light may travel through one or more layers of the user's skin to a photodetector 310. For example, the light transmitted by the light-emitting component 315 and received by the photodetector 310-a may travel along a first optical channel 320-a and the light transmitted by the light-emitting component 315 and received by the photodetector 310-b may travel along a second optical channel 320-b. Upon receiving the light using the photodetector 310, the wearable device 104 (or a processing unit of the wearable device 104) may compare characteristics of the transmitted light to characteristics of the received light to determine the physiological measurements for the user.

In some examples, an orientation of the optical components may affect the accuracy of the physiological measurements performed by the wearable device 104. As one example, the optical components may be oriented such that the one or more light-emitting components 315 transmit light towards a palm-side of the user's finger. This orientation may be equated to an orientation 305-a as depicted in the FIG. 3. In another example, the optical components may be orientated such that the one or more light-emitting components 315 transmit light towards a dorsal-side of the user's finger. This orientation may be equated to an orientation 305-c as depicted in FIG. 3. When the optical components are situated in the orientation 305-a, the wearable device 104 may perform more accurate measurements compared to when the optical components are situated in the orientation 305-c. Light received by the photodetectors 310 in the orientation 305-a (e.g., palm-side) may travel through soft tissues, whereas light received by the photodetectors 310 in orientation 305-c (e.g., dorsal-side) may travel through hard tissue of the user's finger (e.g., bone) due to the hard tissue of the finger being closer to the dorsal side of the finger. Hard tissue may absorb certain wavelengths of light (e.g., red light) more so than soft tissue, making it difficult for the wearable device 104 to obtain accurate physiological measurements.

As described herein, the wearable device 104 may determine an orientation metric associated with the orientation 305 of the wearable device 104 and perform physiological measurements based on the determined orientation metric. In one example, using the light-emitting component 315, the wearable device 104 may transmit first light associated with a first wavelength and second light associated with a second wavelength. In some examples, the first light may not be affected (and/or may be relatively unaffected) by the orientation 305 of the wearable device 104. In other words, the first light may not experience an increase in absorption by the hard tissue when compared to the soft tissue. On the other hand, the second light may be affected by the orientation 305 of the wearable device 104. In other words, the second light may experience a higher absorption by the hard tissue when compared to the soft tissue. An example of the first light may be IR light with a wavelength of 800 nanometers (nm) to 1 millimeter (mm), and an example of second light may be red light with a wavelength of 620 nm to 750 nm.

The wearable device 104 may receive the first light at the photodetector 310-a and the photodetector 310-b. The first light received by the photodetector 310-a may travel the first optical channel 320-a and the first light received by the photodetector 310-b may travel the second optical channel 320-b. Upon receiving the first light at the photodetector 310-a, the wearable device 104 may generate a first signal and upon receiving the first light at the photodetector 310-b, the wearable device 104 may generate a second signal. The first signal may represent a signal strength (or a DC level) of the first light received at the photodetector 310-a and the second signal may represent a signal strength of the first light received at the photodetector 310-b.

Further, the wearable device 104 may receive the second light at the photodetector 310-a and the photodetector 310-b. The second light received by the photodetector 310-a may travel the first optical channel 320-a and the second light received by the photodetector 310-b may travel the second optical channel 320-b. Similarly, upon receiving the second light at the photodetectors 310-a, 310-b, the wearable device 104 may generate a third signal and a fourth signal, respectively. The third signal may represent a signal strength (or a DC level) of the second light received at the photodetector 310-a and the fourth signal may represent a signal strength of the second light received at the photodetector 310-b. In some examples, the light-emitting component may transmit the first light and the second light using a fixed current level (e.g., 15 milliamps (mA)).

In this regard, in some cases, the wearable device 104 may generate four separate signals for the different combinations of light and optical channels 320: (1) IR light along first optical channel 320-a, (2) IR light along second optical channel 320-b, (3) red light along first optical channel 320-a, (2) red light along second optical channel 320-b.

Upon generating the first signal, the second signal, the third signal, and the fourth signal, the wearable device 104 may determine an orientation metric associated with the orientation of the wearable device 104. In one example, the wearable device 104 may average the first signal and the second signal (e.g., IR light signals) to generate first average signal strength of the received first light by the photodetector 310-a and the photodetector 310-b. Further, the wearable device 104 may average the third signal and the fourth signal (e.g., red light signals) to generate a second average signal strength of the received second signal by the photodetector 310-a and the photodetector 310-b. The wearable device 104 may then determine a rotation index contributor (RIC) based on a ratio or a difference between the first average signal strength and the second average signal strength. For example, the RIC may be equal to the second average signal strength (e.g., average red light DC level) divided by the first average signal strength (average IR light DC level) as shown in Equation 1 below:

$$RIC = \frac{RED_{DC}}{IR_{DC}} \quad (1)$$

While the RIC is described above as being calculated based on four separate signals (e.g., average of red DC levels compared to an average of IR DC levels), this is provided solely for illustration. In additional or alternative cases, techniques described herein may utilize two separate signals to determine a RIC value that is subsequently used to determine/estimate the orientation of the wearable device 104. For example, in some cases, the wearable device 104 may generate two separate signals (e.g., IR signal, red signal) using only the first optical channel 320-a. In such cases, referring to Equation 1 above, the wearable device 104 may determine a RIC using the two separate signals (as compared to techniques described above that compute an average of two different sets of signals).

The RIC may be indicative of the orientation 305 of the wearable device 104. In particular, the wearable device 104 may exhibit highest RIC value(s) when positioned in the orientation 305-a, and may exhibit lowest RIC value(s) when positioned in orientation 305-c. This is because more of the second light (or red light) may be absorbed while the wearable device 104 is in the orientation 305-c when compared to the orientation 305-a, resulting in a larger difference between signal strengths, and therefore a lower RIC value.

The graph 310 shown in FIG. 3 illustrates how the RIC may change as the orientation 305 of the wearable device 104 changes. In the example of FIG. 3, the different orientations 305 of the wearable device 104 may be the orientation 305-a, an orientation 305-b, the orientation 305-c, and an orientation 305-d. In the example of FIG. 3, the orientation 305-a may be a reference point (0°) for all other orientations 305. In orientation 305-b, the optical components may be rotated 90° from orientation 305-a. In orientation 305-c, the optical components may be rotated 180° from orientation 305-a. In orientation 305-d, the optical components may be rotated 270° from orientation 305-a.

As shown in FIG. 3, the graph 310 may include separate RIC curves 315-a, 315-b corresponding to RIC values determined for the first optical channel 320-a and the second optical channel 320-b. For example, the first RIC curve 315-a may be plotted by comparing a red signal strength level to an IR signal strength level for light transmitted along the first optical channel 320-a. Comparatively, the second RIC curve 315-b may be plotted by comparing a red signal strength level to an IR signal strength level for light transmitted along the second optical channel 320-b.

Referring to FIG. 3, while in orientation 305-a, the RIC values may be approximately equal (e.g., due to the symmetrical physiology of the finger). Moreover, while in orientation 305-a, the RIC values may be at a maximum value. Moving to orientation 305-b, the RIC values may decrease relative to the RIC values determined while in orientation 305-b. This is due to the fact that, as the ring rotates toward the dorsal side, the signal strength of red light changes (e.g., decreases), while the signal strength of IR light remains relatively unaffected. Further, as shown in orientation 305-b, the RIC value of the first optical channel 320-a (illustrated by first RIC curve 315-a) may be lower than the RIC value of the second optical channel 320-b (illustrated by second RIC curve 315-b). This is because, while in orientation 305-b, the first optical channel 320-a is closer to the dorsal side of the finger as compared to the second optical channel 320-b, leading to more red light being absorbed (e.g., lower signal strength) along the first optical channel 320-a as compared to the second optical channel 320-b.

Continuing with reference to the graph 310 in FIG. 3, the RIC values may be approximately equal (e.g., due to the symmetrical physiology of the finger) while in orientation 305-c. Moreover, while in orientation 305-c, the RIC values may be at a minimum value. Moving to orientation 305-*d*, the RIC values may increase relative to the RIC values determined while in orientation 305-*c*. Comparing the RIC curves 315-*a*, 315-*b* while in the orientation 305-*b* and the orientation 305-*d*, it may be seen that the RIC values for the respective optical channels 320 essentially flip flop with one another. Specifically, as shown in orientation 305-*d*, the RIC value of the second optical channel 320-*b* (illustrated by second RIC curve 315-*b*) may be lower than the RIC value of the first optical channel 320-*a* (illustrated by first RIC curve 315-*a*), where the opposite is true in orientation 305-*b*. This is because, while in orientation 305-*d*, the second optical channel 320-*b* is closer to the dorsal side of the finger as compared to the first optical channel 320-*a*, leading to more red light being absorbed (e.g., lower signal strength) along the second optical channel 320-*b* as compared to the first optical channel 320-*a*.

In some aspects, the RIC values (illustrated by RIC curves 315) may be used to determine or estimate an orientation of the wearable device 104. In order to determine the orientation 305 of the wearable device 104, the wearable device 104 may compare the determined RIC value(s) to one or more RIC ranges (or thresholds). In some examples, each RIC range may correspond to a different orientation 305. For example, a first RIC range may correspond to the orientation 305-*a*, a second RIC range may correspond to the orientation 305-*b*, a third RIC range may correspond to the orientation 305-*c*, and a fourth RIC range may correspond to the orientation 305-*d*. If a determined RIC value falls within a respective range, the wearable device 104 may determine its orientation 305 is the orientation 305 corresponding to the respective range. In some cases, the wearable device 104 (and/or a user device 104) may compare individual RIC values/curves to the respective thresholds to determine the orientation. Additionally, or alternatively, the wearable device 104 may average determined RIC values (e.g., average RIC values of RIC curves 315-*a* and 315-*b*), and may compare the average RIC value to the respective thresholds to determine the orientation.

Moreover, in some cases, the wearable device 104 may be able to determine which direction the wearable device 104 has been rotated. In other words, instead of just determining that the wearable device has been rotated 90° (based on the RIC values in orientation 305-*b* and/or 305-*c*), the wearable device 104 may determine whether the wearable device 104 has been rotated 90° clockwise or counterclockwise. For example, the wearable device 104 (and/or user device 106) may compare the RIC values for the first optical channel 320-*a* (e.g., first RIC curve 315-*a*) with the RIC values for the second optical channel 320-*b* (e.g., second RIC curve 315-*b*) to determine a direction of rotation. As shown in graph 310, if the RIC values for the first optical channel 320-*a* (first RIC curve 315-*a*) are greater than the RIC values for the second optical channel 320-*b* (second RIC curve 315-*b*), the wearable device 104 may determine that the wearable device 104 is in orientation 305-*d*, and has been rotated 90° clockwise (or 270° counterclockwise). Conversely, if the RIC values for the second optical channel 320-*a* (second RIC curve 315-*b*) are greater than the RIC values for the first optical channel 320-*a* (first RIC curve 315-*a*), the wearable device 104 may determine that the wearable device 104 is in orientation 305-*b*, and has been rotated 90° counterclockwise (or 270° clockwise).

In some examples, the RIC ranges (e.g., thresholds) used to determine/estimate the orientation of the wearable device 104 may be predetermined (e.g., based on measurement performed during testing of the wearable device 104 or other wearable devices 104) and stored in a memory of the wearable device 104. In some examples, the ranges may be different for different sizes of the wearable device 104 (e.g., ring sizes). For example, RIC ranges/thresholds for smaller ring sizes may be shifted up in value when compared to larger ring sizes. This is due to the fact that different ring sizes exhibit varying distances between light-emitting components 315 and photodetectors 315, thereby resulting in varying signal strengths.

In another example, the wearable device 104 may determine the ranges of RIC values based on performing a calibration procedure. During the calibration procedure, the wearable device 104 may instruct the user to rotate the wearable device 104 to the orientation 305-*a*, followed by the orientation 305-*b*, followed by the orientation 305-*c*, and followed by the orientation 305-*d* during different calibration periods. For each orientation 305 and calibration period, the wearable device 104 may transmit additional light associated with the first wavelength and the second wavelength and calculate a RIC value(s). The RIC range (or threshold) corresponding to a respective orientation 305 may be based on the RIC discovered for the respective orientation 305 during the calibration procedure. In some examples, the additional light transmitted during the calibration periods may be transmitted using the same transmit power. In other words, the transmit power for the red light may remain constant across all the calibration periods (and orientations 305) of the calibration procedure. Similarly, the transmit power for the IR light may remain constant across all the calibration periods (and orientations 305) of the calibration procedure.

In another example, the wearable device 104 may monitor the RIC values of the wearable device 104 as the user wears the wearable device 104 for a duration (e.g., a period of multiple days, a week, etc.) and identify one or both of a maximum RIC value or a minimum RIC value. For instance, as the user wears the ring over the course of a month, the ring will likely rotate across all the orientations 305-*a*, 305-*b*, 305-*c*, and 305-*d*. From the maximum RIC value or minimum RIC value, the wearable device 104 may determine the RIC ranges. For example, the first RIC range may be based on the maximum RIC value and the third RIC range may be based on the minimum RIC value. In such cases, the wearable device 104 may observe maximum and minimum RIC values, and may be configured to associate maximum RIC values with the first orientation 305-*a*, and may associate minimum RIC values with the third orientation 305-*c*.

In some examples, the wearable device 104 may perform one or more actions based on the orientation metric of the wearable device 104. As one example, the wearable device 104 may compare the RIC to a RIC threshold. The RIC threshold may be a minimum acceptable RIC for accurate physiological measurements. In some examples, the RIC threshold may be based on the RIC ranges, the maximum RIC, or the minimum RIC. For example, the RIC threshold may be equal to an RIC included in the first range, the second range, or the fourth range or may be equal to the maximum RIC. If the RIC meets or exceeds the RIC threshold, the wearable device 104 may determine that the wearable device 104 is not in the orientation 305-*c* and is in a more optimal orientation 305 (e.g., the orientation 305-*a*, the orientation 305-*b*, or the orientation 305-*d*) and may perform physiological measurements for the user.

If the RIC does not meet or exceed the RIC threshold, the wearable device 104 may determine that the wearable device 104 is not in an optical orientation 305 (e.g., in the orientation 305-*c*) and refrain from performing the physiological measurements for the user. Alternatively, the wearable device 104 may update a set of measurement parameters for performing the physiological measurements based on RIC not meeting or exceeding the RIC threshold. Updating the set of measurement parameters may include adjusting (e.g., increasing) a transmit power, current, or voltage of the light-emitting component 315 or adjusting an algorithm for acquiring physiological measurements (e.g., adjust a signal strength value of the received light or the transmitted light). Additionally, or alternatively, if the RIC does not meet or exceed the RIC threshold, the wearable device may display (e.g., using a GUI of a user device 106 associated with the wearable device 104) a message instructing the user to rotate the wearable device 104 to a more optical orientation 305 (e.g., the orientation 305-$a$).

Further, the wearable device 104 may perform one or more actions related to acquiring physiological measurements based on determining a direction of rotation of the wearable ring device 104. For example, while in the orientation 305-$b$, the wearable device 104 may select to perform physiological measurements using the second optical channel 320-$b$. As such, the wearable device 104 may activate the second photodetector 310-$b$, and may deactivate the first photodetector 310-$a$. By way of another example, while in orientation 305-$b$, the wearable device 104 may increase a voltage or current applied to the light-emitting component 315 in order to improve a signal strength of signals received at the first photodetector 310-$a$, and thereby improve a quality of physiological data measured using the first optical channel 320-$a$. Similarly, the wearable device 104 may adjust an algorithm used to analyze signals received at the first photodetector 310-$a$ based on the wearable device 104 being in the orientation 305-$b$ (e.g., while in orientations 305-$b$ and 305-$d$, the wearable device 104 may utilize different algorithms or other measurement parameters for evaluating physiological data measured along the respective optical channels 320).

The wearable device 104 may measure the RIC (e.g., the average RIC or RICs for different optical channels 320) and store the measured RIC on a periodic (e.g., every 2.5-10 seconds) or aperiodic basis. In some examples, the most recent RIC may replace an old RIC in the memory. In another example, the wearable device 104 may store the past RIC values along with the most recent RIC value (e.g., in order to determine the minimum RIC or the maximum RIC). The wearable device 104 may perform the RIC measurements during the daytime, the nighttime, or both.

Further, due to the physiological differences between fingers of a user of the wearable device 104, switching the wearable device 104 from a first finger of the user to a second finger of the user may impact the RIC. Thus, in the event that the user wears the wearable device 104 on multiple fingers, the wearable device 104 may perform a calibration procedure for each finger to generate finger-specific RIC profiles. For example, the wearable device 104 may perform a first calibration procedure when the wearable device 104 is on the first finger to determine the ranges associated with each orientation 305 when the wearable device 104 is on the first finger. Further, the wearable device 104 may perform a second calibration procedure while the wearable device 104 is on the second finger to determine the ranges associated with each orientation 305 when the wearable device 104 is on the second finger. To determine the orientation 305 of the wearable device 104, the wearable device 104 may identify which finger the wearable device 105 is on (e.g., via user input or via physiological measurements (e.g., SpO2 measurements)) and compare the RIC to the ranges corresponding to the identified finger.

Additionally, or alternatively, the wearable device 104 may identify which finger the wearable device 104 is on based on determined RIC value(s). For example, the wearable device 104 may monitor the RIC and compare the RIC to the ranges corresponding to the first finger and the ranges corresponding to the second finger. If the RIC falls within a range of the first finger and does not fall within a range of the second finger, the wearable device 104 may determine that the wearable device 104 is on the first finger. Using the method as described herein may allow a wearable device 104 to adjust one or more measurement parameters for acquiring physiological data based on a rotation or orientation of the wearable device 104 in effort to acquire accurate physiological data for the user.

Figure 4:
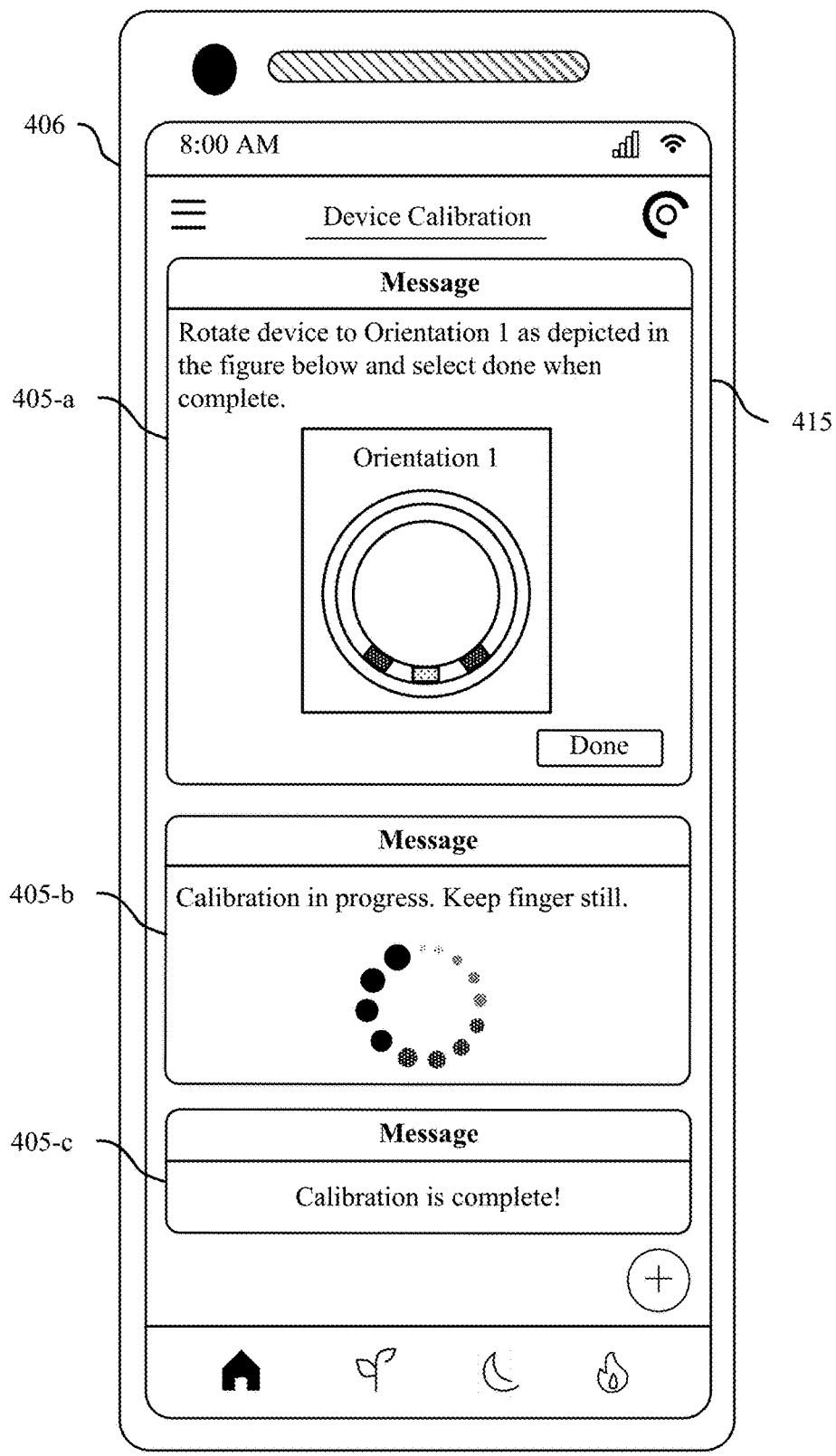
FIG. 4 shows an example of a graphical user interface (GUI) that supports techniques for detecting an orientation of a wearable device in accordance with aspects of the present disclosure.

FIG. 4 shows an example of a GUI 400 that supports techniques for detecting an orientation of a wearable device in accordance with aspects of the present disclosure. In some examples, the GUI 400 may implement, or be implemented by, aspects of the system 100, the system 200, the system 300, or any combination thereof. For example, the GUI 400 may be an example of GUI 275 included in a user device 106 associated with a wearable device 104 as described in FIG. 2.

As described with reference to FIG. 3, the wearable device 104 may perform a calibration procedure to determine RIC ranges (or RIC thresholds). During the calibration procedure, the wearable device 104 may generate and display a set of messages 405 on an application page 415 which may be displayed to the user of the wearable device via the GUI 400 of the user device 406. Although the GUI 400 illustrates the application page 415 displaying all of the message 405, it is understood that the messages 405 may be displayed on the application page 415 at different times.

In some examples, the user may navigate to the application page 415 corresponding to device calibration and start the calibration procedure. In some examples, upon initiation of the calibration procedure, the application page 415 may display the message 405-$a$. The message 405-$a$ may instruct the user to rotate the wearable device to an orientation 1. For example, the message 405-$a$ may state "Rotate device to orientation 1 as depicted in the figure below and select done when complete." In the orientation 1, optical components of the wearable device may be facing towards the palm-side of the user's finger similar to orientation 305-$a$ as described in FIG. 3. Further, the message 405-$a$ may provide a visual representation of the wearable device in the desired orientation. After the user rotates the wearable device to the desired orientation, the user may select the icon "done" which may be displayed in the bottom right corner of the message 405-$a$ below the illustration of orientation 1.

After receiving the user input (e.g., the user selecting done), the user device 406 may transmit signaling to the wearable device to perform measurements to determine the RIC range for the orientation 1. Further, the user device 406 may display a message 405-$b$ on the application page 415 corresponding to device calibration indicating that calibration is in process. For example, the message 405-$b$ may state "Calibration is in progress. Please keep finger still." Further, the application page 415 may display a loading icon signifying that calibration is in process. The duration of performing the measurements may be known as a calibration period.

Upon determining the RIC measurements for orientation 1, subsequent messages 405 may instruct the user to rotate the ring to different orientations during different calibration periods (e.g., second orientation 305-$b$ during second calibration period, third orientation 305-*c* during third calibration period, etc.) so that the system can calculate RIC values for each respective orientation. Upon calculating RIC values for the respective orientations during the respective calibration periods, the wearable device 104 may transmit signaling to the user device 406 indicating completion of the RIC measurements and in some examples, may additionally transmit signaling indicating the RIC range associated with the orientation. Upon receiving the signaling, the user device 406 may display a message 405-*c*. The message 405-*c* may indicate to the user that the calibration is complete. For example, the message 405-*c* may state "Calibration is complete."

In some cases, the user device 406 and the wearable device may perform the calibration procedure multiple times. For example, the user device 406 and the wearable device may perform the calibration procedure once every week, month, or year. Further, the user device 406 and the wearable device may perform the calibration procedure for different fingers of the user. In such cases, the wearable device 104 and/or user device 106 may be configured to determine which finger the ring is being worn on by comparing determined RIC values to respective RIC ranges determined for the respective fingers.

Figure 5:
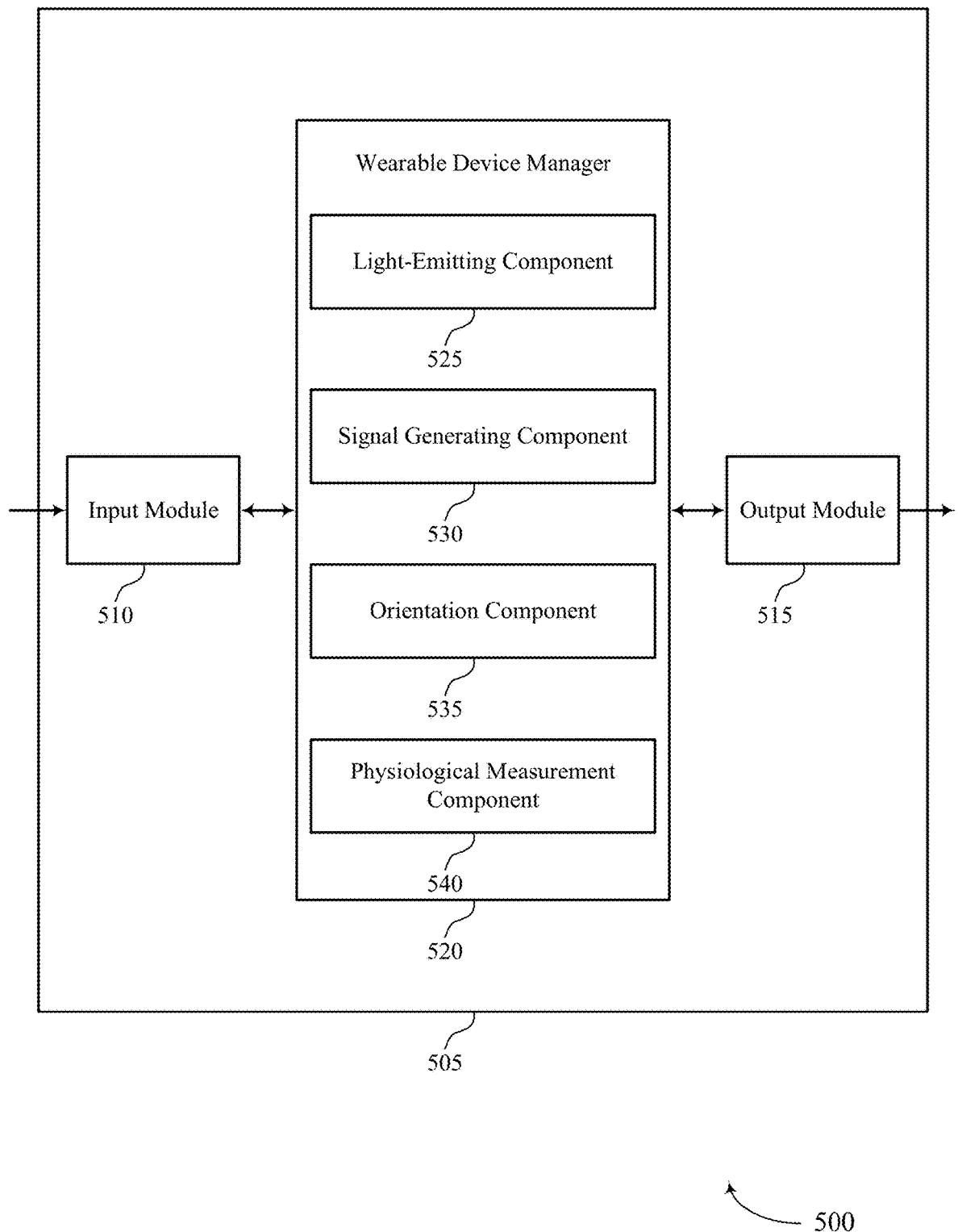
FIG. 5 shows a block diagram of an apparatus that supports techniques for detecting an orientation of a wearable device in accordance with aspects of the present disclosure.

FIG. 5 shows a block diagram 500 of a device 505 that supports techniques for detecting an orientation of a wearable device in accordance with aspects of the present disclosure. The device 505 may include an input module 510, an output module 515, and a wearable device manager 520. The device 505, or one or more components of the device 505 (e.g., the input module 510, the output module 515, and the wearable device manager 520), may include at least one processor, which may be coupled with at least one memory, to support the described techniques. Each of these components may be in communication with one another (e.g., via one or more buses).

For example, the wearable device manager 520 may include a light-emitting component 525, a signal generating component 530, an orientation component 535, a physiological measurement component 540, or any combination thereof. In some examples, the wearable device manager 520, or various components thereof, may be configured to perform various operations (e.g., receiving, monitoring, transmitting) using or otherwise in cooperation with the input module 510, the output module 515, or both. For example, the wearable device manager 520 may receive information from the input module 510, send information to the output module 515, or be integrated in combination with the input module 510, the output module 515, or both to receive information, transmit information, or perform various other operations as described herein.

The wearable device manager 520 may support detecting an orientation of a wearable device worn in accordance with examples as disclosed herein. The light-emitting component 525 may be configured as or otherwise support a means for transmitting, using one or more light-emitting components of the wearable device, first light associated with a first wavelength and second light associated with a second wavelength. The signal generating component 530 may be configured as or otherwise support a means for generating a first signal and a second signal based at least in part on the first light and the second light, respectively, received using one or more photodetectors of the wearable device. The orientation component 535 may be configured as or otherwise support a means for determining an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device. The physiological measurement component 540 may be configured as or otherwise support a means for acquiring physiological data from the user via the wearable device using a set of measurement parameters that are determined based at least in part on the orientation metric.

Figure 6:
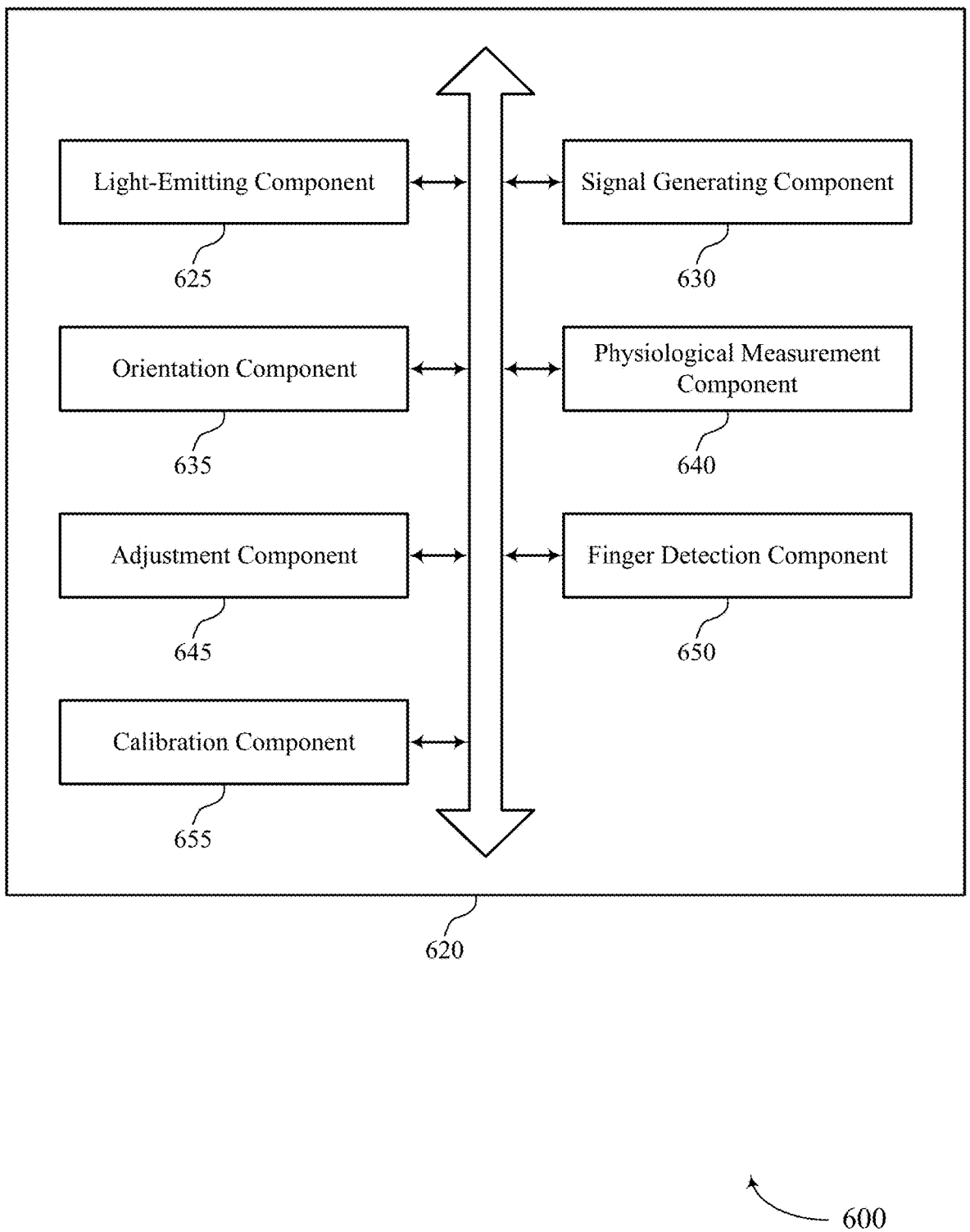
FIG. 6 shows a block diagram of a wearable device manager that supports techniques for detecting an orientation of a wearable device in accordance with aspects of the present disclosure.

FIG. 6 shows a block diagram 600 of a wearable device manager 620 that supports techniques for detecting an orientation of a wearable device in accordance with aspects of the present disclosure. The wearable device manager 620 may be an example of aspects of a wearable device manager or a wearable device manager 520, or both, as described herein. The wearable device manager 620, or various components thereof, may be an example of means for performing various aspects related to techniques for detecting an orientation of a wearable device as described herein. For example, the wearable device manager 620 may include a light-emitting component 625, a signal generating component 630, an orientation component 635, a physiological measurement component 640, an adjustment component 645, a finger detection component 650, a calibration component 655, or any combination thereof. Each of these components, or components of subcomponents thereof (e.g., one or more processors, one or more memories), may communicate, directly or indirectly, with one another (e.g., via one or more buses).

The wearable device manager 620 may support detecting an orientation of a wearable device worn in accordance with examples as disclosed herein. The light-emitting component 625 may be configured as or otherwise support a means for transmitting, using one or more light-emitting components of the wearable device, first light associated with a first wavelength and second light associated with a second wavelength. The signal generating component 630 may be configured as or otherwise support a means for generating a first signal and a second signal based at least in part on the first light and the second light, respectively, received using one or more photodetectors of the wearable device. The orientation component 635 may be configured as or otherwise support a means for determining an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device. The physiological measurement component 640 may be configured as or otherwise support a means for acquiring physiological data from the user via the wearable device using a set of measurement parameters that are determined based at least in part on the orientation metric.

In some examples, the orientation component 635 may be configured as or otherwise support a means for determining a ratio between the first signal strength and the second signal strength, wherein the orientation metric is based at least in part on the ratio.

In some examples, the orientation component 635 may be configured as or otherwise support a means for comparing the ratio to one or more thresholds, wherein the orientation metric is based at least in part on comparing the ratio to the one or more thresholds.

In some examples, the orientation metric indicates that the wearable device is positioned in a first orientation based at least in part on the ratio satisfying a first threshold of the one or more thresholds. In some examples, the orientation metric indicates that the wearable device is positioned in a second orientation based at least in part on the ratio satisfying a second threshold of the one or more thresholds.

In some examples, the calibration component 655 may be configured as or otherwise support a means for generating, via the wearable device or a user device associated with the wearable device, instructions for performing a calibration procedure, wherein the instructions comprise at least a first instruction to adjust the orientation of the wearable device to a plurality of orientations throughout a plurality of calibration periods. In some examples, the calibration component 655 may be configured as or otherwise support a means for transmitting, as part of the calibration procedure during the plurality of calibration periods corresponding to the plurality of orientations, additional light associated with the first wavelength and the second wavelength. In some examples, the calibration component 655 may be configured as or otherwise support a means for determining the one or more thresholds based at least in part on transmitting the additional light during the plurality of calibration periods.

In some examples, the additional light associated with the first wavelength is transmitted during each of the plurality of calibration periods using a first transmit power. In some examples, the first light associated with the first wavelength is transmitted using the first transmit power. In some examples, the additional light associated with the second wavelength is transmitted during each of the plurality of calibration periods using a second transmit power. In some examples, the second light associated with the second wavelength is transmitted using the second transmit power.

In some examples, the wearable device comprises a wearable ring device. In some examples, the one or more thresholds are based at least in part on a ring size of the wearable ring device.

In some examples, the adjustment component 645 may be configured as or otherwise support a means for generating, via the wearable device or a user device associated with the wearable device, an instruction for the user to adjust the orientation of the wearable device based at least in part on the orientation metric.

In some examples, to support generating the first signal and the second signal, the signal generating component 630 may be configured as or otherwise support a means for generating the first signal based at least in part on the first light received at a first photodetector of the one or more photodetectors. In some examples, to support generating the first signal and the second signal, the signal generating component 630 may be configured as or otherwise support a means for generating the second signal based at least in part on the second light received at the first photodetector, the method further comprising. In some examples, to support generating the first signal and the second signal, the signal generating component 630 may be configured as or otherwise support a means for generating a third signal based at least in part on the first light received at a second photodetector of the one or more photodetectors. In some examples, to support generating the first signal and the second signal, the signal generating component 630 may be configured as or otherwise support a means for generating a fourth signal based at least in part on the second light received at the second photodetector, wherein the orientation metric is further based at least in part on a second comparison of the third signal and the fourth signal.

In some examples, the orientation component 635 may be configured as or otherwise support a means for determining a first ratio between the first signal strength and the second signal strength. In some examples, the orientation component 635 may be configured as or otherwise support a means for determining a second ratio between a third signal strength associated with the third signal and a fourth signal strength associated with the fourth signal, wherein the orientation metric is based at least in part on the first ratio and the second ratio.

In some examples, the wearable device comprises a wearable ring device, and the orientation component 635 may be configured as or otherwise support a means for determining a direction of rotation of the wearable ring device worn by the user based at least in part on comparing the first ratio with the second ratio, wherein the orientation metric is based at least in part on the direction of rotation.

In some examples, the physiological measurement component 640 may be configured as or otherwise support a means for activating the first photodetector and deactivating the second photodetector based at least in part on the first ratio being greater than the second ratio, wherein the physiological data is acquired via the wearable device based at least in part on activating the first photodetector and deactivating the second photodetector.

In some examples, the physiological measurement component 640 may be configured as or otherwise support a means for adjusting an algorithm for acquiring physiological data from the user based at least in part on the orientation metric.

In some examples, the wearable device comprises a wearable ring device worn on one of a plurality of fingers of the user, and the finger detection component 650 may be configured as or otherwise support a means for determining that the wearable ring device is being worn on a first finger of the plurality of fingers of the user based at least in part on a comparison of the first signal strength and the second signal strength, wherein the set of measurement parameters are determined based at least in part on determining that the wearable ring device is being worn on the first finger of the user.

In some examples, the set of measurement parameters comprise a current or voltage applied to the one or more light-emitting components.

In some examples, the first light comprises IR light and the second light comprises red light.

In some examples, the wearable device comprises a wearable ring device. In some examples, the orientation of the wearable device comprises a rotational orientation of the wearable ring device worn on a finger of the user.

Figure 7:
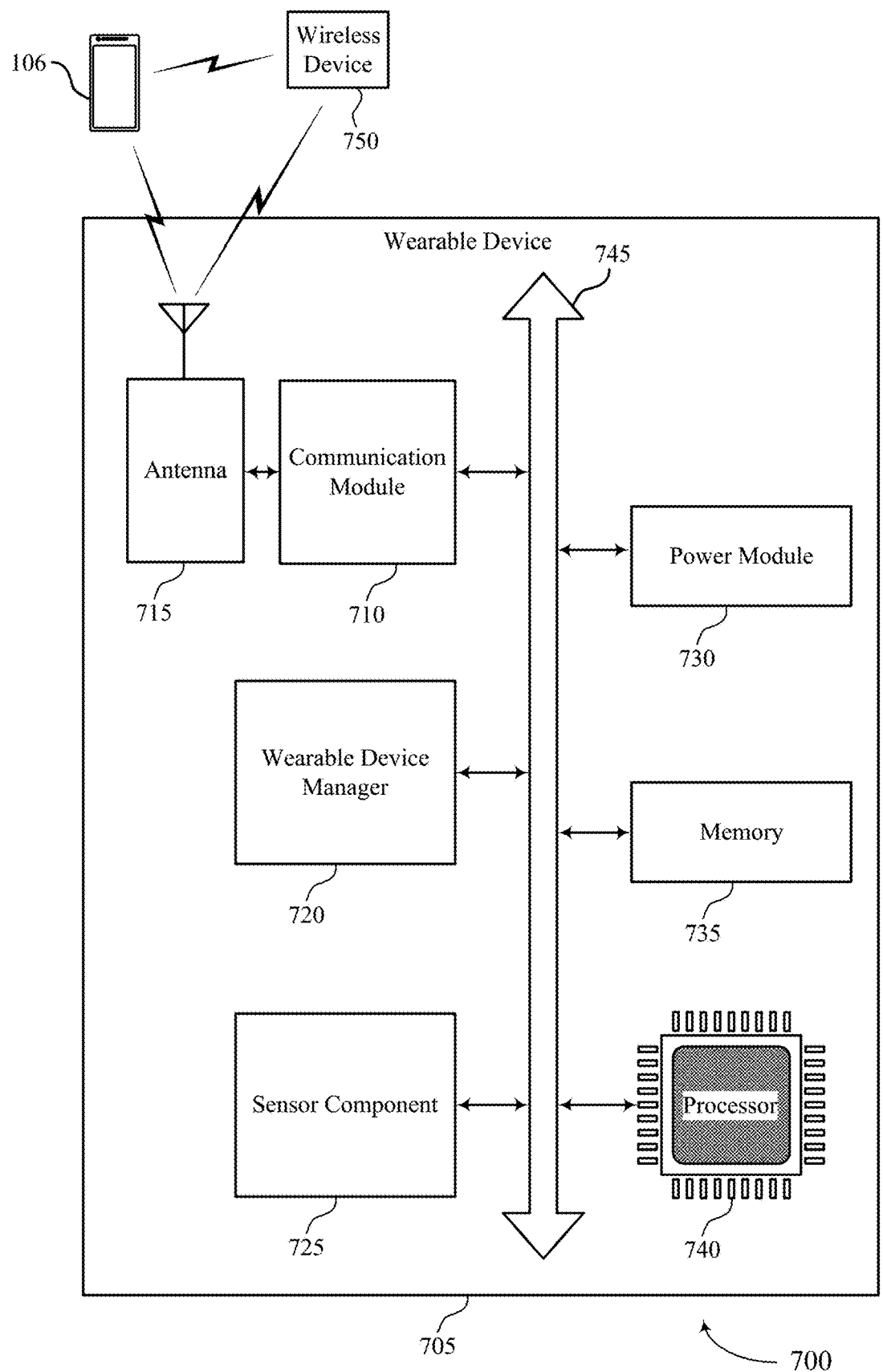
FIG. 7 shows a diagram of a system including a device that supports techniques for detecting an orientation of a wearable device in accordance with aspects of the present disclosure.

FIG. 7 shows a diagram of a system 700 including a device 705 that supports techniques for detecting an orientation of a wearable device in accordance with aspects of the present disclosure. The device 705 may be an example of or include the components of a device 505 as described herein. The device 705 may include an example of a wearable device 104, as described previously herein. The device 705 may include components for bi-directional communications including components for transmitting and receiving communications with a user device 106 and a server 110, such as a wearable device manager 720, a communication module 710, an antenna 715, a sensor component 725, a power module 730, at least one memory 735, at least one processor 740, and a wireless device 750. These components may be in electronic communication or otherwise coupled (e.g., operatively, communicatively, functionally, electronically, electrically) via one or more buses (e.g., a bus 745).

The wearable device manager 720 may support detecting an orientation of a wearable device worn in accordance with examples as disclosed herein. For example, the wearable device manager 720 may be configured as or otherwise support a means for transmitting, using one or more light-emitting components of the wearable device, first light associated with a first wavelength and second light associated with a second wavelength. The wearable device manager 720 may be configured as or otherwise support a means for generating a first signal and a second signal based at least in part on the first light and the second light, respectively, received using one or more photodetectors of the wearable device. The wearable device manager 720 may be configured as or otherwise support a means for determining an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device. The wearable device manager 720 may be configured as or otherwise support a means for acquiring physiological data from the user via the wearable device using a set of measurement parameters that are determined based at least in part on the orientation metric.

By including or configuring the wearable device manager 720 in accordance with examples as described herein, the device 705 may support techniques for increasing the accuracy of physiological measurements by accounting for an orientation of the wearable device.

Figure 8:
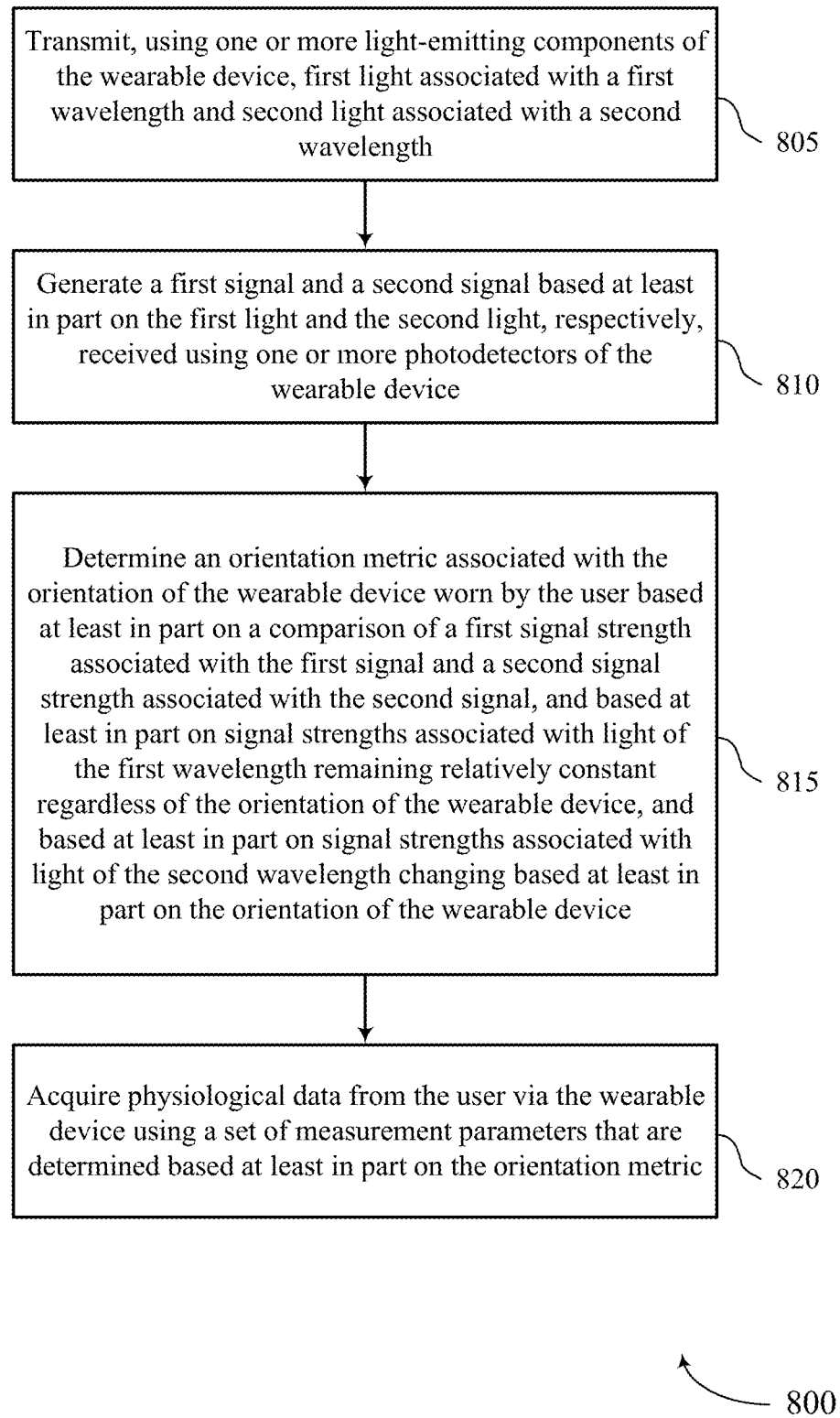
FIGS. 8 and 9 show flowcharts that support techniques for detecting an orientation of a wearable device in accordance with aspects of the present disclosure.

FIG. 8 shows a flowchart illustrating a method 800 that supports techniques for detecting an orientation of a wearable device in accordance with aspects of the present disclosure. The operations of the method 800 may be implemented by a wearable device or its components as described herein. For example, the operations of the method 800 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 805, the method may include transmitting, using one or more light-emitting components of the wearable device, first light associated with a first wavelength and second light associated with a second wavelength. The operations of block 805 may be performed in accordance with examples as disclosed herein. In some examples, aspects of the operations of 805 may be performed by a light-emitting component 625 as described with reference to FIG. 6.

At 810, the method may include generating a first signal and a second signal based at least in part on the first light and the second light, respectively, received using one or more photodetectors of the wearable device. The operations of block 810 may be performed in accordance with examples as disclosed herein. In some examples, aspects of the operations of 810 may be performed by a signal generating component 630 as described with reference to FIG. 6.

At 815, the method may include determining an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device. The operations of block 815 may be performed in accordance with examples as disclosed herein. In some examples, aspects of the operations of 815 may be performed by an orientation component 635 as described with reference to FIG. 6.

At 820, the method may include acquiring physiological data from the user via the wearable device using a set of measurement parameters that are determined based at least in part on the orientation metric. The operations of block 820 may be performed in accordance with examples as disclosed herein. In some examples, aspects of the operations of 820 may be performed by a physiological measurement component 640 as described with reference to FIG. 6.

Figure 9:
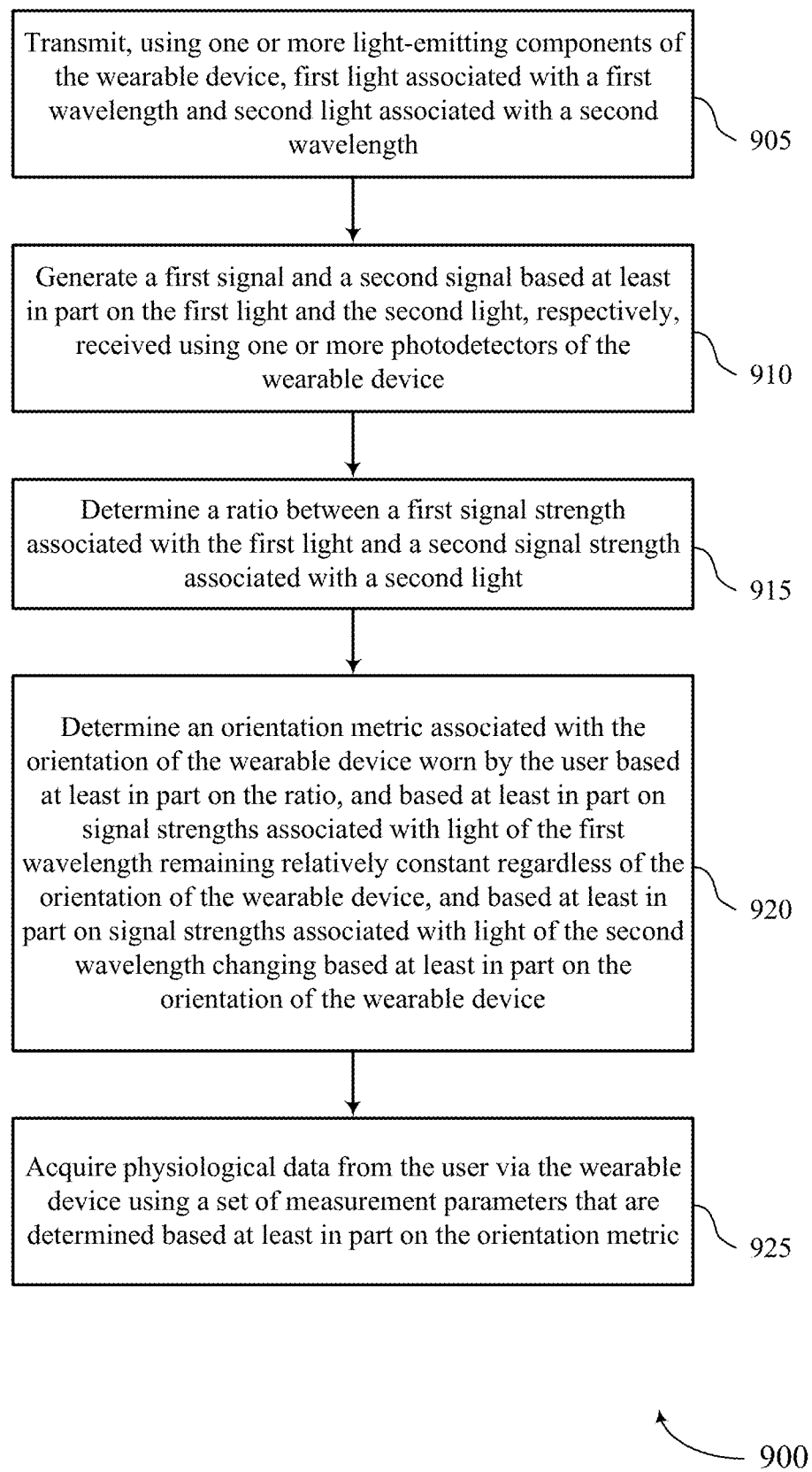

FIG. 9 shows a flowchart illustrating a method 900 that supports techniques for detecting an orientation of a wearable device in accordance with aspects of the present disclosure. The operations of the method 900 may be implemented by a wearable device or its components as described herein. For example, the operations of the method 900 may be performed by a wearable device as described with reference to FIGS. 1 through 7. In some examples, a wearable device may execute a set of instructions to control the functional elements of the wearable device to perform the described functions. Additionally, or alternatively, the wearable device may perform aspects of the described functions using special-purpose hardware.

At 905, the method may include transmitting, using one or more light-emitting components of the wearable device, first light associated with a first wavelength and second light associated with a second wavelength. The operations of block 905 may be performed in accordance with examples as disclosed herein. In some examples, aspects of the operations of 905 may be performed by a light-emitting component 625 as described with reference to FIG. 6.

At 910, the method may include generating a first signal and a second signal based at least in part on the first light and the second light, respectively, received using one or more photodetectors of the wearable device. The operations of block 910 may be performed in accordance with examples as disclosed herein. In some examples, aspects of the operations of 910 may be performed by a signal generating component 630 as described with reference to FIG. 6.

At 915, the method may include determining a ratio between a first signal strength associated with the first signal and a second signal strength associated with the second signal. The operations of block 915 may be performed in accordance with examples as disclosed herein. In some examples, aspects of the operations of 915 may be performed by an orientation component 635 as described with reference to FIG. 6.

At 920, the method may include determining an orientation metric associated with the orientation of the wearable device worn by the user based at least in part on the ratio, and based at least in part on signal strengths associated with light of the first wavelength remaining relatively constant regardless of the orientation of the wearable device, and based at least in part on signal strengths associated with light of the second wavelength changing based at least in part on the orientation of the wearable device. The operations of block 920 may be performed in accordance with examples as disclosed herein. In some examples, aspects of the operations of 920 may be performed by an orientation component 635 as described with reference to FIG. 6.

At 925, the method may include acquiring physiological data from the user via the wearable device using a set of measurement parameters that are determined based at least in part on the orientation metric. The operations of block 925 may be performed in accordance with examples as disclosed herein. In some examples, aspects of the operations of 925 may be performed by a physiological measurement component 640 as described with reference to FIG. 6.

It should be noted that the methods described above describe possible implementations, and that the operations and the steps may be rearranged or otherwise modified and that other implementations are possible. Furthermore, aspects from two or more of the methods may be combined.

A method for detecting an orientation of a wearable device worn by a user is described. The method may include transmitting, using one or more light-emitting components of the wearable device, first light associated with a first wavelength and second light associated with a second wavelength, generating a first signal and a second signal based at least in part on the first light and the second light, respectively, received using one or more photodetectors of the wearable device, determining an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device, and acquiring physiological data from the user via the wearable device using a set of measurement parameters that are determined based at least in part on the orientation metric.

A user for detecting an orientation of a wearable device worn is described. The user may include one or more memories storing processor executable code, and one or more processors coupled with the one or more memories. The one or more processors may individually or collectively operable to execute the code to cause the user to transmit, using one or more light-emitting components of the wearable device, first light associated with a first wavelength and second light associated with a second wavelength, generate a first signal and a second signal based at least in part on the first light and the second light, respectively, received using one or more photodetectors of the wearable device, determine an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device, and acquire physiological data from the user via the wearable device using a set of measurement parameters that are determined based at least in part on the orientation metric.

Another user for detecting an orientation of a wearable device worn is described. The user may include means for transmitting, using one or more light-emitting components of the wearable device, first light associated with a first wavelength and second light associated with a second wavelength, means for generating a first signal and a second signal based at least in part on the first light and the second light, respectively, received using one or more photodetectors of the wearable device, means for determining an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device, and means for acquiring physiological data from the user via the wearable device using a set of measurement parameters that are determined based at least in part on the orientation metric.

A non-transitory computer-readable medium storing code for detecting an orientation of a wearable device worn is described. The code may include instructions executable by a processor to transmit, using one or more light-emitting components of the wearable device, first light associated with a first wavelength and second light associated with a second wavelength, generate a first signal and a second signal based at least in part on the first light and the second light, respectively, received using one or more photodetectors of the wearable device, determine an orientation metric associated with the orientation of the wearable device worn by the user based at least in part on a comparison of a first signal strength associated with the first signal and a second signal strength associated with the second signal, and based at least in part on signal strengths associated with light of the first wavelength remaining relatively constant regardless of the orientation of the wearable device, and based at least in part on signal strengths associated with light of the second wavelength changing based at least in part on the orientation of the wearable device, and acquire physiological data from the user via the wearable device using a set of measurement parameters that are determined based at least in part on the orientation metric.

Some examples of the method, users, and non-transitory computer-readable medium described herein may further include operations, features, means, or instructions for determining a ratio between the first signal strength and the second signal strength, wherein the orientation metric may be based at least in part on the ratio.

Some examples of the method, users, and non-transitory computer-readable medium described herein may further include operations, features, means, or instructions for comparing the ratio to one or more thresholds, wherein the orientation metric may be based at least in part on comparing the ratio to the one or more thresholds.

In some examples of the method, users, and non-transitory computer-readable medium described herein, the orientation metric indicates that the wearable device may be positioned in a first orientation based at least in part on the ratio satisfying a first threshold of the one or more thresholds and the orientation metric indicates that the wearable device may be positioned in a second orientation based at least in part on the ratio satisfying a second threshold of the one or more thresholds.

Some examples of the method, users, and non-transitory computer-readable medium described herein may further include operations, features, means, or instructions for generating, via the wearable device or a user device associated with the wearable device, instructions for performing a calibration procedure, wherein the instructions comprise at least a first instruction to adjust the orientation of the wearable device to a plurality of orientations throughout a plurality of calibration periods, transmitting, as part of the calibration procedure during the plurality of calibration periods corresponding to the plurality of orientations, additional light associated with the first wavelength and the second wavelength, and determining the one or more thresholds based at least in part on transmitting the additional light during the plurality of calibration periods.

In some examples of the method, users, and non-transitory computer-readable medium described herein, the additional light associated with the first wavelength may be transmitted during each of the plurality of calibration periods using a first transmit power, the first light associated with the first wavelength may be transmitted using the first transmit power, the additional light associated with the second wavelength may be transmitted during each of the plurality of calibration periods using a second transmit power, and the second light associated with the second wavelength may be transmitted using the second transmit power.

In some examples of the method, users, and non-transitory computer-readable medium described herein, the wearable device comprises a wearable ring device and the one or more thresholds may be based at least in part on a ring size of the wearable ring device.

Some examples of the method, users, and non-transitory computer-readable medium described herein may further include operations, features, means, or instructions for generating, via the wearable device or a user device associated with the wearable device, an instruction for the user to adjust the orientation of the wearable device based at least in part on the orientation metric.

In some examples of the method, users, and non-transitory computer-readable medium described herein, generating the first signal and the second signal may include operations, features, means, or instructions for generating the first signal based at least in part on the first light received at a first photodetector of the one or more photodetectors, generating the second signal based at least in part on the second light received at the first photodetector, the method further comprising, generating a third signal based at least in part on the first light received at a second photodetector of the one or more photodetectors, and generating a fourth signal based at least in part on the second light received at the second photodetector, wherein the orientation metric may be further based at least in part on a second comparison of the third signal and the fourth signal.

Some examples of the method, users, and non-transitory computer-readable medium described herein may further include operations, features, means, or instructions for determining a first ratio between the first signal strength and the second signal strength and determining a second ratio between a third signal strength associated with the third signal and a fourth signal strength associated with the fourth signal, wherein the orientation metric may be based at least in part on the first ratio and the second ratio.

In some examples of the method, users, and non-transitory computer-readable medium described herein, the wearable device comprises a wearable ring device and the method, apparatuses, and non-transitory computer-readable medium may include further operations, features, means, or instructions for determining a direction of rotation of the wearable ring device worn by the user based at least in part on comparing the first ratio with the second ratio, wherein the orientation metric may be based at least in part on the direction of rotation.

Some examples of the method, users, and non-transitory computer-readable medium described herein may further include operations, features, means, or instructions for activating the first photodetector and deactivating the second photodetector based at least in part on the first ratio being greater than the second ratio, wherein the physiological data may be acquired via the wearable device based at least in part on activating the first photodetector and deactivating the second photodetector.

Some examples of the method, users, and non-transitory computer-readable medium described herein may further include operations, features, means, or instructions for adjusting an algorithm for acquiring physiological data from the user based at least in part on the orientation metric.

In some examples of the method, users, and non-transitory computer-readable medium described herein, the wearable device comprises a wearable ring device worn on one of a plurality of fingers of the user and the method, apparatuses, and non-transitory computer-readable medium may include further operations, features, means, or instructions for determining that the wearable ring device may be being worn on a first finger of the plurality of fingers of the user based at least in part on a comparison of the first signal strength and the second signal strength, wherein the set of measurement parameters may be determined based at least in part on determining that the wearable ring device may be being worn on the first finger of the user.

In some examples of the method, users, and non-transitory computer-readable medium described herein, the set of measurement parameters comprise a current or voltage applied to the one or more light-emitting components.

In some examples of the method, users, and non-transitory computer-readable medium described herein, the first light comprises IR light and the second light comprises red light.

In some examples of the method, users, and non-transitory computer-readable medium described herein, the wearable device comprises a wearable ring device and the orientation of the wearable device comprises a rotational orientation of the wearable ring device worn on a finger of the user.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as IR, radio, and microwave, then the coaxial cable, fiber optic cable, twisted pair, DSL, or wireless technologies such as IR, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for detecting an orientation of a wearable device worn by a user, comprising:
    transmitting, using one or more light-emitting components of the wearable device, first light associated with a first wavelength and second light associated with a second wavelength;
    generating a first signal and a second signal based at least in part on the first light and the second light, respectively, received using one or more photodetectors of the wearable device;
    determining, based at least in part on the first wavelength associated with the first light being different than the second wavelength associated with the second light, an orientation metric associated with the orientation of the wearable device worn by the user based at least in part on a comparison of a first signal strength associated with the first signal and a second signal strength associated with the second signal, based at least in part on the first signal strength associated with the first light of the first wavelength being unaffected by the orientation of the wearable device, and based at least in part on the second signal strength associated with the second light of the second wavelength changing based at least in part on the orientation of the wearable device; and
    acquiring physiological data from the user via the wearable device using a set of measurement parameters that are determined based at least in part on the orientation metric.

2. The method of claim 1, further comprising:
    determining a ratio between the first signal strength and the second signal strength, wherein the orientation metric is based at least in part on the ratio.

3. The method of claim 2, further comprising:
    comparing the ratio to one or more thresholds, wherein the orientation metric is based at least in part on comparing the ratio to the one or more thresholds.

4. The method of claim 3, wherein the orientation metric indicates that the wearable device is positioned in a first orientation based at least in part on the ratio satisfying a first threshold of the one or more thresholds, and wherein the orientation metric indicates that the wearable device is positioned in a second orientation based at least in part on the ratio satisfying a second threshold of the one or more thresholds.

5. The method of claim 3, further comprising:
generating, via the wearable device or a user device associated with the wearable device, instructions for performing a calibration procedure, wherein the instructions comprise at least a first instruction to adjust the orientation of the wearable device to a plurality of orientations throughout a plurality of calibration periods;
transmitting, as part of the calibration procedure during the plurality of calibration periods corresponding to the plurality of orientations, additional light associated with the first wavelength and the second wavelength; and
determining the one or more thresholds based at least in part on transmitting the additional light during the plurality of calibration periods.

6. The method of claim 5, wherein the additional light associated with the first wavelength is transmitted during each of the plurality of calibration periods using a first transmit power, the first light associated with the first wavelength that is transmitted using the first transmit power, and wherein the additional light associated with the second wavelength is transmitted during each of the plurality of calibration periods using a second transmit power, the second light associated with the second wavelength that is transmitted using the second transmit power.

7. The method of claim 3, wherein the wearable device comprises a wearable ring device, and wherein the one or more thresholds are based at least in part on a ring size of the wearable ring device.

8. The method of claim 1, further comprising:
generating, via the wearable device or a user device associated with the wearable device, an instruction for the user to adjust the orientation of the wearable device based at least in part on the orientation metric.

9. The method of claim 1, wherein generating the first signal and the second signal comprises:
generating the first signal based at least in part on the first light received at a first photodetector of the one or more photodetectors; and
generating the second signal based at least in part on the second light received at the first photodetector, the method further comprising:
generating a third signal based at least in part on the first light received at a second photodetector of the one or more photodetectors; and
generating a fourth signal based at least in part on the second light received at the second photodetector, wherein the orientation metric is further based at least in part on a second comparison of the third signal and the fourth signal.

10. The method of claim 9, further comprising:
determining a first ratio between the first signal strength and the second signal strength; and
determining a second ratio between a third signal strength associated with the third signal and a fourth signal strength associated with the fourth signal, wherein the orientation metric is based at least in part on the first ratio and the second ratio.

11. The method of claim 10, wherein the wearable device comprises a wearable ring device, the method further comprising:

determining a direction of rotation of the wearable ring device worn by the user based at least in part on comparing the first ratio with the second ratio, wherein the orientation metric is based at least in part on the direction of rotation.

12. The method of claim 10, further comprising:
activating the first photodetector and deactivating the second photodetector based at least in part on the first ratio being greater than the second ratio, wherein the physiological data is acquired via the wearable device based at least in part on activating the first photodetector and deactivating the second photodetector.

13. The method of claim 1, further comprising:
adjusting an algorithm for acquiring physiological data from the user based at least in part on the orientation metric.

14. The method of claim 1, wherein the wearable device comprises a wearable ring device worn on one of a plurality of fingers of the user, the method further comprising:
determining that the wearable ring device is being worn on a first finger of the plurality of fingers of the user based at least in part on a comparison of the first signal strength and the second signal strength, wherein the set of measurement parameters are determined based at least in part on determining that the wearable ring device is being worn on the first finger of the user.

15. The method of claim 1, wherein the set of measurement parameters comprises a current or voltage applied to the one or more light-emitting components.

16. The method of claim 1, wherein the first light comprises infrared (IR) light and the second light comprises red light.

17. The method of claim 1, wherein the wearable device comprises a wearable ring device, and wherein the orientation of the wearable device comprises a rotational orientation of the wearable ring device worn on a finger of the user.

18. A wearable device for detecting an orientation of the wearable device worn by a user, comprising:
one or more memories storing processor-executable code; and
one or more processors coupled with the one or more memories and individually or collectively operable to execute the code to cause the wearable device to:
transmit, using one or more light-emitting components of the wearable device, first light associated with a first wavelength and second light associated with a second wavelength;
generate a first signal and a second signal based at least in part on the first light and the second light, respectively, received using one or more photodetectors of the wearable device;
determine, based at least in part on the first wavelength associated with the first light being different than the second wavelength associated with the second light, an orientation metric associated with the orientation of the wearable device worn by the user based at least in part on a comparison of a first signal strength associated with the first signal and a second signal strength associated with the second signal, based at least in part on the first signal strength associated with the first light of the first wavelength being unaffected by the orientation of the wearable device, and based at least in part on the second signal strength associated with the second light of the second wavelength changing based at least in part on the orientation of the wearable device; and acquire physiological data from the user via the wearable device using a set of measurement parameters that are determined based at least in part on the orientation metric.

19. The wearable device of claim 18, wherein the one or more processors are individually or collectively further operable to execute the code to cause the wearable device to:
determine a ratio between the first signal strength and the second signal strength, wherein the orientation metric is based at least in part on the ratio.

* * * * *